United States Patent Office 2,928,738
Patented Mar. 15, 1960

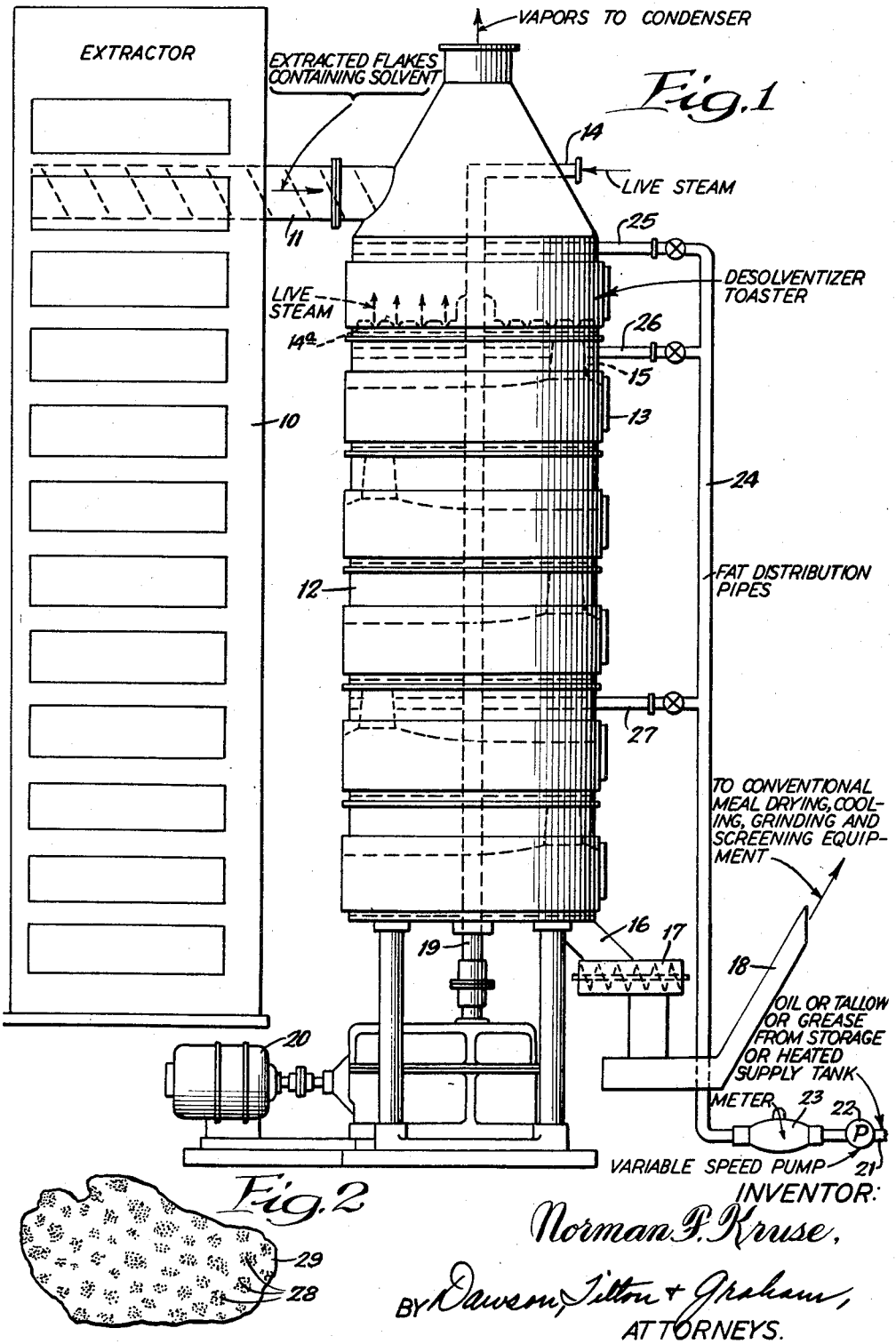

2,928,738

HIGH FAT CONTENT OILSEED MEAL

Norman F. Kruse, Decatur, Ind., assignor to Central Soya Company, Inc., Fort Wayne, Ind., a corporation of Indiana Application July 27, 1956, Serial No. 600,512

9 Claims. (Cl. 99—2)

This invention relates to high fat content oilseed meal, and is particularly useful in the production of meals having a high fat or oil content with superior nutritional qualities while at the same time possessing excellent handling, shipping and binning properties.

The desirability of adding fat in substantial quantities to meals has long been recognized, the fat being needed in the stock and poultry feeding rations as an economical source of energy. Efforts to supply this need have met with limited success because of the tendency of the added fat or oil to bleed in the paper or cloth package causing subsequent rancidity and also to interfere with the flow and handling properties of the meal. Further, such a product cannot be produced by the normal mixing techniques, since much of the added fat will remain on the surface of the particles rather than penetrating into the interior, and the resultant product is oily or greasy depending upon the melting-point of the added fat. Also, as stated above, the fat will bleed into paper or cloth bags which contain the material, and the meal has very poor handling and flow properties. Consequently, very small amounts of fat have been added, and while such fat has contributed toward reducing the dust in the feed and adding somewhat to palatability, this seems to have been the extent of usefulness. No one has succeeded in incorporating in such feeds high levels of fat which are incorporated for nutritional value and which exist within the meal in a substantially "bound" form so that the resulting meal is dry in texture, having substantially no tendency to bleed into the paper or cloth package, and having flow and handling properties similar to those of regular oilseed meals.

An object of the present invention is to prepare an oilseed meal having a high level of fat content with good keeping qualities while at the same time providing a dry texture meal having good flow and handling properties and no tendency to bleed into the container material. A further object is to provide a process for the preparation of a high fat content oilseed meal which is efficient and which may be carried out economically and with the production of a large volume of meal. A still further object is to provide an oilseed meal having the desirable characteristics of dry meals, such as regular soybean meal, while at the same time retaining within the interior thereof a high fat content. Yet a further object is to prepare an oilseed meal of a porous character having sealed therein a high fat content in excess of 10%, while at the same time having its particles dry in texture and readily flowable in the handling thereof. Other specific objects and advantages will appear as the specification proceeds.

The invention herein may be carried out in various forms of apparatus. One embodiment of the invention may be practiced in the apparatus shown in the accompanying drawings, in which—

Figure 1 is a broken view in elevation of apparatus which may be utilized in the practice of the invention; and Fig. 2, a greatly enlarged drawing showing a particle of meal which is permeated with fat and prepared in accordance with my invention.

For the purpose of illustration, the process herein will be described in connection with the treatment of soybean flakes. In the specific illustration given in the drawing, the flakes move from an extraction tower 10 through a conduit 11 into the top of a cooker or toaster 12, which consists of a series of agitated kettles 13 which have been indicated as No. 1, No. 2, No. 3, No. 4, No. 5 and No. 6. Into the top kettle No. 1 is passed extracted flakes containing solvent, and live steam entering through pipe 14 is introduced through pipes carried by sweeps 14a in the bottom of the kettle. The sweeps rotatably mounted in the bottom of the kettles serve to mix the meal and to move it, while at the same time steam is discharged from the pipes which are carried by the sweeps. The meal from kettle No. 1 is discharged through an outlet 15 into the kettles therebelow, where the equipment is the same as described for kettle No. 1, and where the treatment is repeated. The meal thus finds its way downwardly through the various outlet ports between the kettles and is finally discharged through the discharge outlet 16 into a variable screw conveyor feeder discharge control 17 and thence through pipe 18 to the usual meal drying, cooling, grinding and screening equipment. The various sweeps are mounted upon a hollow shaft 19 which is driven through reduction gearing by the motor 20. Since all of the foregoing apparatus is well known in the industry, a further detailed description herein is believed unnecessary.

In the practice of the new process, a fat material is delivered from a source (not shown) to the variable speed pump 22 and is metered to the process by the flow meter 23. Preferably, the fat or oil is pumped from a heated supply tank and then delivered through the vertical pipe 24 to a distribution pipe 25 which is perforated to deliver the fat onto the extracted flakes in the topmost kettle (No. 1). For some purposes, it is sufficient to deliver the fat only into the topmost kettle, but sometimes it may be desirable to add additional amounts of fat through the distribution pipes 26 and 27. It will be understood that the manner of distribution of the fat among the various kettles may vary, depending upon the meal being handled, the fat that is being added, and the amount of fat which is to be incorporated.

In the operation of the process embodiment illustrated in Fig. 1, extracted soybean flakes containing 25 to 35% solvent are conveyed from the extractor 10 to the desolventizer-toaster or cooker 12 through the screw conveyor 11 while at the same time the fat or oil to be added is pumped from storage or from a heated supply tank by the variable speed proportioning pump 22 and metered to the process by the flow meter 23. The fat is added to the extracted flakes, which are still wet with solvent, in the top kettel (No. 1) through the perforated distribution pipe 25. At the same time, the normal live steam addition by means of the sweep 14a in the top kettle is increased to furnish additional steam to heat the added fat. In this operation, the liquid solvent present in the flakes is effective in dissolving the fat, thus reducing its viscosity, and increasing its ability to penetrate into the meal particle. The extracted flakes at this stage are highly porous and readily absorb the fat. At the same time, the live steam acts not only to raise the temperature of the mixture but also, as it condenses upon the meal which is maintained below the boiling-point of water, furnishes a physical driving force which drives the fat into the interior of the meal particles. The subsequent drying of the meal operates in some manner which cannot be fully explained, to seal the fat within the meal particles. In effect, the fat becomes like the bound fat in the original soybean, and there is substantially no tendency for the oil thereafter to bleed during the packaging and shipping operations.

In order to increase the palatability and value of the meal as a product, the meal is toasted by cooking it above the boiling-point of water and until the meal obtains a golden brown color.

The soybean particle treated as above described is illustrated in Fig. 2, and it will be noted that this particle, which is highly magnified, has fat, indicated by the numeral 28, distributed thoroughly through the interior of the soybean oil meal particle, while the surface portions 29 of the particle are relatively free of the fat. As a result, the particle itself is dry in texture and has excellent flow and handling properties.

While in the foregoing illustrative process I have referred to the treatment of soybean oil meal, it will be understood that the process is applicable with comparable results to other oilseed meals such as, for example, cottonseed meal, linseed meal, copra meal, corn oil meal, and the like.

While I prefer to carry on the process as described in detail above, and in which the meal being treated is wet with a liquid such as solvent, it will be understood that a satisfactory product can be obtained in other ways while still incorporating fat substantially in excess of ten percent. For example, a very good product containing up to 18–20% fat was made by adding fat which is solid at room temperature to cold finished meal and then steaming with live steam in a cooker. The condensation of the live steam on the cold particles furnished the heat and driving force necessary to make the fat penetrate the particles. In this abbreviated process, it is found highly desirable to employ fat which is solid at room temperature.

Specific examples of the process may be set out as follows:

*Example I*

A sample of extracted flakes from an extractor containing 32% of volatile matter (extraction solvent) was treated with 20% yellow grease and with live steam for 15 minutes. The finished product was noticeably granular in structure and had excellent flow properties, showing no tendency to bleed into the paper or cloth packages.

In comparison with the above process, a product was made by adding 20% yellow grease to finished meal after the same had been cooked or toasted in the desolventizer-toaster apparatus, and then steaming the material under hot conditions with live steam for 15 minutes. While a satisfactory product was obtained, the product was not as dry and did not have as good flow properties as the product obtained where the grease was added to the raw extracted flakes, which are apparently more porous and absorb the grease more quickly. The solvent apparently functions to dissolve the grease, lowering its viscosity and thus aiding absorption. Further, the raw flakes are more porous, permitting the grease to soak into them better and to enter the pores vacated by the original oil. Finally, the heating, cooking and toasting seals in the fat within the meal particles to produce the dry exterior texture giving the excellent flow properties above referred to.

*Example II*

A finished meal obtained through the use of the desolventizer-toaster process was moistened with 10% water and then heated with live steam for 15 minutes. The water appeared to swell the meal, thus opening the pores to permit better penetration of grease, and the live steam not only served to raise the temperature of the mixture, but also the condensation of the steam was effective in driving the fat into the interior of the meal particles. The subsequent drying was found to seal in the grease within the particles and to give a product having good flow properties, though not as good as the flow properties of the product obtained where the fat was added to the raw extracted flakes, as described in Example I.

*Example III*

The process was carried on as described in Example II hereof except that cottonseed meal was substituted for the soybean meal. The process also, when applied to linseed meal, copra meal, and corn oil meal, gave comparable results to those described in Example II. The finished meal particle was permeated with fat so that it contained substantially more than the 10% of fat, while the exterior surface of the meal particle had a dry texture and substantially no tendency to bleed into the paper or cloth containers.

*Example IV*

A sample of extracted peanut meal from an extractor containing 35% hexane (extraction solvent) was treated with 18% tallow and heated with indirect jacket steam and sufficient live steam to rapidly elevate the temperature of the mixture to 210° F. with a moisture content of 20% due to the condensation of steam on the meal-fat mixture. The material was then dried and ground to standard finished meal particle size. The finished product was free of extraction solvent, granular in structure, having excellent flow properties and no tendency to bleed the fat into the container packages when packed.

In all of the operations, it was found that the steaming operation and the condensation of the steam upon the meal was most effective in furnishing the driving force necessary to make the fat penetrate the particles. Further, the drying or toasting of the meal produced a change in the particle structure which effectively sealed the fat within the particle. The fat in the resulting particle is, in effect, bound fat, and does not exude from the particle or bleed into the bags or packages. In my Patent No. 2,710,258, I have described the action of the steam and toasting operation in destroying the cell structure and in producing a new product in which the protein masses appear to flow together. It is possible that this transformation in the cellular structure itself, after the incorporation of the fat and by reason of the application of steam and heat, is the effective means for sealing the fat within the meal particle. In any event, it is found that the foregoing process results in the penetration of the particle with fat even when the content is substantially above 10%, and that thereafter a change occurs which seals the fat within the particle and prevents it from bleeding or transferring with the natural flow properties of the oilseed meal.

While, in the foregoing specification, I have described a product and the procedure of preparing it in considerable detail for the purpose of illustrating the invention, it will be understood that such details may be varied widely by those skilled in the art without departing from the spirit of my invention.

I claim:

1. In a process for incorporating fat in oilseed meals, the steps of adding fat in excess of 10% to the meal, introducing live steam into the meal while maintaining the meal at a temperature at which the steam will condense thereon whereby said fat is driven into the interior of the meal, and finally drying the meal.

2. The process of claim 1, in which the meal contains a liquid at the time of the introduction of the live steam there-into.

3. The process of claim 1, in which the meal is saturated with solvent.

4. The process of claim 1, in which water is added to the meal before introducing the live steam there-into.

5. In a process for incorporating fat in oilseed meals, the steps of adding fat in excess of 10% and which is solid at room temperature to the meal, introducing live steam into the meal and fat to drive said fat into the interior of the meal while maintaining the meal at a temperature at which the steam will condense thereon, and finally drying the meal.

6. The process of claim 5, in which the meal is toasted in the drying operation.

7. In a process for incorporating fat in soybean oil meal, the steps of adding fat in excess of 10% to the meal, introducing live steam into the meal while maintaining the meal at a temperature at which the steam will condense thereon whereby said fat is driven into the interior of the meal, and finally drying the meal.

8. In a process for incorporating fat into soybean oil meal, the steps of adding fat in excess of 10% to the raw extracted soybean oil meal flakes containing solvent, introducing live steam into the flakes and condensing the steam thereon to drive said fat into the interior of the meal, and finally drying the meal.

9. The process of claim 8, in which the steamed flakes are toasted in the drying operation.

References Cited in the file of this patent

UNITED STATES PATENTS

| | | |
|---|---|---|
| 2,458,679 | Buxton | Jan. 11, 1949 |
| 2,585,793 | Kruse | Feb. 12, 1952 |
| 2,751,301 | Leslie | June 19, 1956 |

FOREIGN PATENTS

| | | |
|---|---|---|
| 140,049 | Australia | 1951 |